March 17, 1953   J. L. SMITH   2,632,152
ROTARY SHAFT CONTROLLED MOTOR VEHICLE TRAFFIC SIGNAL
Filed April 4, 1951
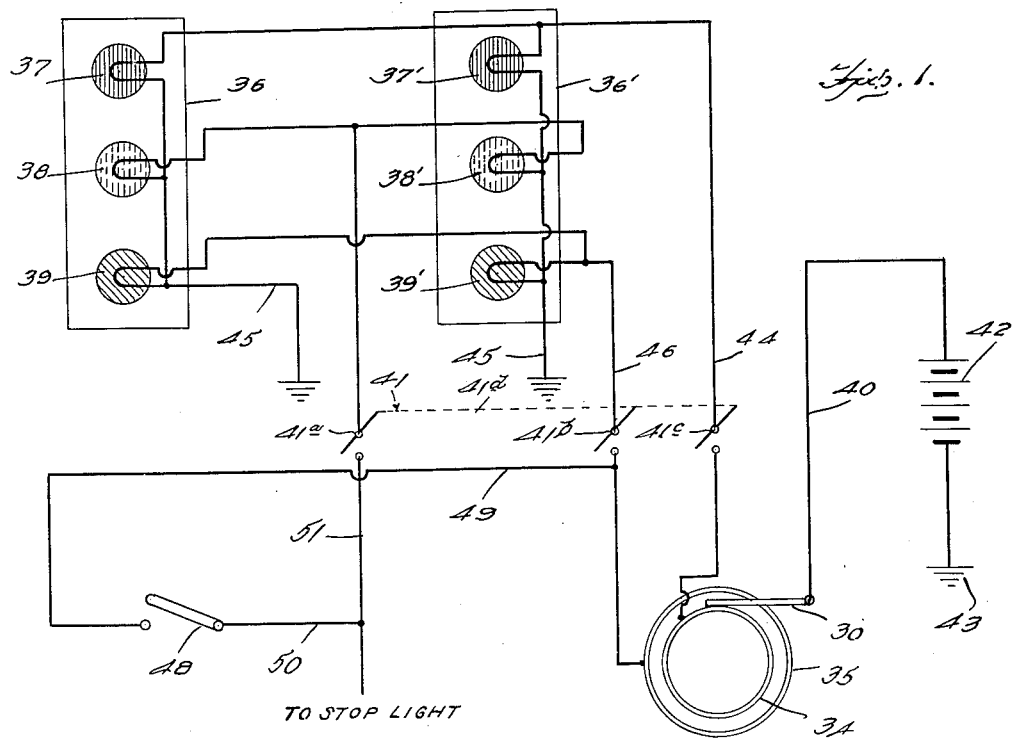
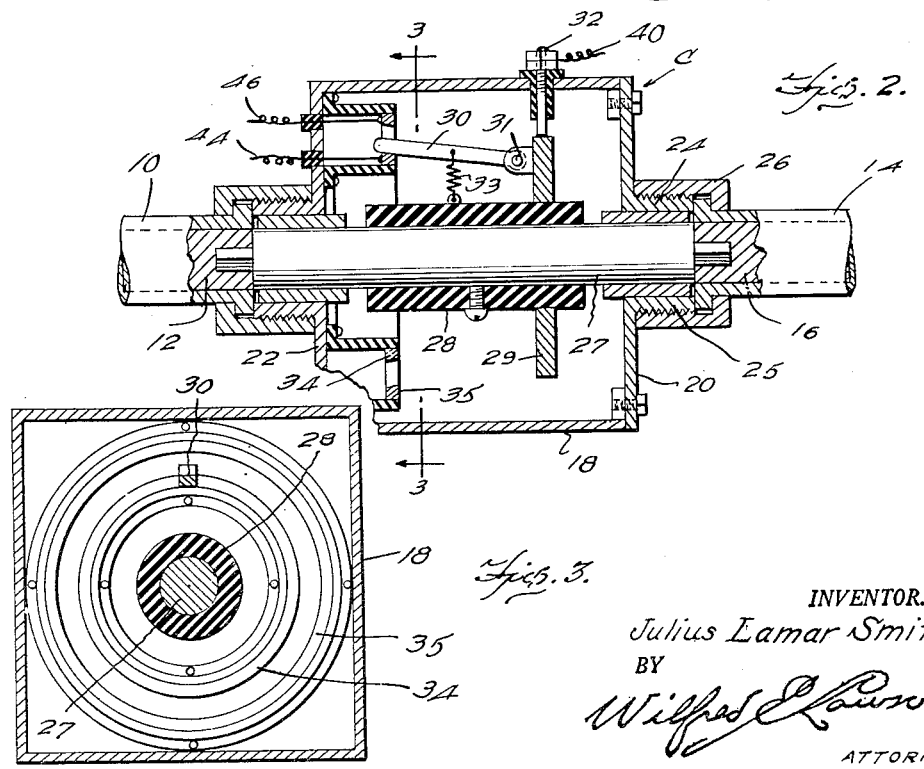
INVENTOR.
Julius Lamar Smith
BY
Wilfred E Lawson
ATTORNEY Patented Mar. 17, 1953

2,632,152

UNITED STATES PATENT OFFICE 2,632,152

ROTARY SHAFT CONTROLLED MOTOR VEHICLE TRAFFIC SIGNAL

Julius Lamar Smith, Jacksonville, Fla.

Application April 4, 1951, Serial No. 219,203

3 Claims. (Cl. 340—62)

This invention relates generally to the class of signaling devices and is directed particularly to a traffic signal designed for use on a motor vehicle and while it may be employed on any type of vehicle the primary application of the signal mechanism is to a school bus.

A principal object of the present invention is to provide a vehicle signal or indicator which is primarily operated from a rotating part of the motor vehicle upon which it is installed, the device being particularly adapted to be operated from the rotating speedometer and it is designed so as to maintain a green or all clear signal while the vehicle is in operation; a combination green and yellow signal when the vehicle brake is applied for slowing down or stopping; and a red signal when the vehicle has come to a full stop, such red signal being independent of and in addition to the standard red stop signal which is customarily required on vehicles to be operated by the foot brake.

Another object of the invention is to provide a signal mechanism of the character stated which is controlled by a centrifugal switch operated by the speedometer cable or another suitable rotating part of the vehicle, such switch functioning to maintain the green signal light operative when the vehicle is running at or above a predetermined speed, and to switch over to the red or stop signal of the mechanism when the speedometer cable ceases to rotate, the green and red signals being independent of the yellow signal giving warning simultaneously with the beginning of the application of the brakes and being energized or made operative when the brake operated stop light switch is closed, under which condition both the green and yellow light will be operative when the vehicle operator is preparing to make a stop so as to give warning to closely following or fast moving vehicles in the rear to permit the same to stop before the signal carrying vehicle comes to a stop.

Other objects and advantages of the invention will become apparent as the description of the same proceeds and the invention will be best understood from a consideration of the following detailed description taken in connection with the accompanying drawing forming a part of the specification, with the understanding, however, that the invention is not to be limited to the exact details of construction shown and described since obvious modifications will occur to a person skilled in the art.

In the drawing:

Figure 1 is a circuit diagram of the present invention showing the connection therein of two sets of signals.

Figure 2 is a detailed sectional view on an enlarged scale of one type of centrifugal switch which may be used and connected in the speedometer cable for the operation of the system.

Figure 3 is a sectional view taken substantially on the line 3—3 of Figure 2.

Referring now more particularly to the drawing there is shown in Figure 2 and generally designated by the reference character C, a centrifugal switch structure designed to be incorporated in a motor vehicle speedometer cable preferably between the cable and its connection with the transmission case of the vehicle engine.

The parts of the centrifugal switch in Figure 2 are more or less conventionally illustrated and in this figure the numeral 10 designates a portion of the cable sheath connected with the transmission case, the cable shaft being designated 12 at this side of the switch while at the opposite side of the switch a portion of the cable sheath is designated 14 and the shaft therein is designated 16.

The switch structure is illustrated as having a housing 18 having the two end walls 20 and 22 in which are the aligned shaft bearings 24 which are here shown as being disposed within the axially aligned threaded nipples 25 which abut or oppose the ends of the speedometer cable sheath sections 10 and 14, to which they are coupled by the threaded cap nuts 26.

Extending through the housing 18 is the short shaft 27 which has its ends mounted in the bearings 24 and which is adapted to be connected in a suitable manner, as shown, with the opposing ends of the speedometer shaft sections 12 and 16 so that the necessary rotary motion will be transmitted through the shaft sections to the speedometer, not shown, by the interposed short switch shaft 27.

Mounted upon the shaft 27 is an insulation collar 28 on which is carried the metal current pick up disk 29. Electrically connected with this disk on one face is the centrifugally actuated switch arm or blade 30, the connection between the blade being by means of the pivot pin 31 which permits the blade to swing radially with respect to the shaft 27.

The numeral 32 designates an electric wire terminal which is in electrical contact with the current pick up disk 29 as shown.

Suitable means may be provided for drawing the switch blade 30 inwardly toward the shaft when the shaft is not rotating, such means being here shown as a spring 33 connected between the blade and the insulation sleeve 28.

The numerals 34 and 35 designate inner and outer current pick up rings which are suitably mounted in insulated relation with one another and with the housing 18 and between these rings the free end of the switch blade 30 extends so that when the shaft 27 is not rotating the spring 33 will pull the blade 30 into electrical contact with the inner ring 34 and when the shaft is rotating centrifugal force will swing the blade outwardly into electrical contact with the outermost ring 35.

The signaling mechanism includes a suitable housing which is conventionally illustrated and indicated by the reference character 36, in which are mounted three incandescent lights of the desired colors or mounted behind lenses of desired colors, such lights being here designated 37, 38 and 39 and representing respectively red, yellow and green signals.

No specific illustration of the signal housing and lights is made or believed necessary in view of the fact that no novelty in the signal housing per se is claimed, since any suitable housing may be employed. Such housing may have front and rear colored lenses for each of the lights or, if desired, there may be provided two separate housings one for the rear of the vehicle and the other for the front of the vehicle such, for example, as the second housing designated 36', the signal lamps for the housings being connected in parallel as shown.

In the installation of the signal, the centrifugal switch terminal 32 is connected by a suitable current conductor 40, to one side of the vehicle battery 42, the other side of the battery being grounded as at 43, in the conventional manner.

The numeral 41 designates a three pole, single throw switch, wherein the poles are designated 41a, 41b, and 41c, coupled together by a common coupling, as diagrammatically indicated at 41d, whereby all may be opened or closed together.

The inside ring 34 of the centrifugal switch is electrically connected by the current conductor 44, through the switch pole 41c, with the red signal lamps 37 and 37', upon one side of the latter, the other side of the lamps being grounded to the ground wire 45, in the conventional manner.

The outside collector ring 35 of the centrifugal switch is connected by the current conductor 46 through the switch pole 41b, with one side of each of the green signal lights 39 and 39' as shown, the other side of each light being grounded, and this wire 46 is also connected to one side of the vehicle brake operated switch 48, by the wire 49.

The other side of the vehicle brake switch 48 is connected by the wire 50 with the customary vehicle stop light, not shown, and it is also electrically coupled by the wire 51 through the switch pole 41a, with one side of the yellow signal light 38 and 38', the other side of which light is grounded as shown.

In the operation of the present system the three pole switch 41, shown in Figure 1, is closed so as to electrically prepare the signal lamp conductors 44, 46 and 51 for service.

When the vehicle is standing so that the shaft 27 is not rotating, the centrifugal switch blade 30 will be closed against the inner collector ring 34 so that electric current will then be conducted through the conductor 44 to the red signal lights 37—37'. No current can flow to the green lights or the brake pedal operated switch 48 when the centrifugal switch blade 30 is in contact with the collector ring 34 and consequently the closing of the foot brake switch 48 will not energize the vehicle stop light or the yellow warning lights 38—38'.

When the vehicle is in operation the rotation of the shaft 27 will swing the centrifugal switch blade 30 outwardly into electrical contact with the outer collector ring 35 and electric current will then be transmitted through the conductor wire 46 to the green signal lights 39—39'.

While the vehicle is running, if the vehicle brake is applied so as to close the regular brake signal light switch 48, the yellow signal or warning lights 38—38' will be energized together with the regular vehicle stop light and until the vehicle comes to a full stop the centrifugal action will maintain the centrifugal switch blade 30 in electric connection with the outer collector ring 35 so that the green lights 39—39' will also be energized along with the lights 38 and 38'. Thus drivers of cars following the vehicle having the signal light thereon, will be given warning that the vehicle is about to come to a stop.

While two separate light units designated 36 and 36' have been shown it is to be understood that the invention is not limited to the use of such units although the same might be employed one upon the rear of the vehicle and one upon the front. Instead of two units use may be made of a single unit having both rearwardly and frontwardly directed light windows or colored lenses so that vehicles coming from both directions may see the signal lights.

The three pole switch shown in Figure 1, when closed energizes the complete traffic signal system of the invention and when it is thrown into open position it cuts out the signal lights and continues to provide energy to the brake pedal operated stop light of the bus which becomes energized when the brake pedal is applied so as to cause the closing of the switch 48. This arrangement is desirable when the bus is being driven without passengers and when no special precautions are required such as would be the case if school children or other passengers were in the vehicle.

As will be readily apparent, when the control switch 41 is thrown into the signal operating position, the system becomes entirely automatic, in that as soon as the vehicle starts to move the green light or lights will be energized and the red stop light or lights will be cut out and when the vehicle brake pedal is operated the green and yellow lights will function together with the regular stop light of the vehicle in the manner previously set forth.

I claim:

1. A signal system for a motor vehicle equipped with a brake operated stop light switch, a battery and a speedometer operated shaft; said system comprising a red, green and yellow electric signaling element, a centrifugal switch including a shaft connected with and rotated by the speedometer shaft, and electric conductors connecting the battery with said centrifugal switch and connecting the centrifugal switch with the red and green signaling elements whereby the red signaling element only is energized when the centrifugal switch shaft is idle and the green signaling element only is energized when the centrifugal switch shaft is turning, a current conductor connected between the current receiving side of the green signaling element and one side of the brake switch, and a current conductor connected between the other side of the brake switch and the yellow signaling element whereby the yellow element becomes energized when the brake switch is closed while the centrifugal switch is rotating.

2. A signaling system of the character set forth in claim 1, with a plural pole switch in circuit between the signal lights and the centrifugally operated switch, said plural pole switch having two movable conductors shiftable to disconnect the centrifugally operated switch from the red and green signaling elements and a third movable conductor shiftable to open the said current conductor between said other side of the brake switch and said yellow signaling element, said plural pole switch being operable to shift said conductors to open the circuits for said signaling elements without cutting off flow of battery current to one side of the brake operated switch when the centrifugal switch shaft is rotating.

3. A signal system for a motor vehicle equipped with a brake operated stop light switch, a battery and a speedometer operated shaft; said system comprising a red, green and yellow electric signaling element, a centrifugal switch including a shaft connected with and rotated by the speedometer shaft, a current pick up disk encircling and insulated from the centrifugal switch shaft, a contact terminal engaging said pick up disk, said contact terminal being electrically connected with one side of the battery, a pair of stationary, concentric, electrically separated and radially spaced current pick up rings encircling said centrifugal switch shaft, a centrifugally actuated switch blade pivotally and electrically connected with said disk and having a free end interposed between said rings, resilient means normally drawing the blade inwardly toward the shaft into electrical contact with the innermost ring, an electric current conductor leading from said innermost ring to one side of the red signaling element, an electric current conductor leading from the outermost ring to one side of the green signaling element, an electric current conductor connected between the said one side of the green signaling element and one side of said brake operated switch, and an electrical conductor connected between the other side of the brake operated switch and one side of the yellow signaling element, the other sides of said elements being grounded, said brake operated switch functioning when closed to energize the yellow signaling element, the electric current for energizing the yellow signaling element flowing through the outermost current collector ring of the centrifugal switch only when the centrifugal switch is rotating at a predetermined speed, and spring means normally urging the centrifugal switch blade inwardly into electric contact with the innermost ring for energizing the red signaling element when the centrifugal switch shaft is idle.

JULIUS LAMAR SMITH.

REFERENCES CITED

The following references are of record in the file of this patent:

UNITED STATES PATENTS

| Number | Name | Date |
| --- | --- | --- |
| 2,096,069 | Seiden | Oct. 19, 1937 |
| 2,128,769 | Finnell | Aug. 30, 1938 |
| 2,260,680 | Nelsen | Oct. 28, 1941 |